(12) United States Patent
Sun et al.

(10) Patent No.: US 9,401,170 B1
(45) Date of Patent: Jul. 26, 2016

(54) PERPENDICULAR MAGNETIC RECORDING MEDIUM WITH EPITAXIAL EXCHANGE COUPLING LAYER

(75) Inventors: Chengjun Sun, Naperville, IL (US); Donald C. Stafford, San Jose, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 493 days.

(21) Appl. No.: 12/625,504

(22) Filed: Nov. 24, 2009

(51) Int. Cl.
*G11B 5/66* (2006.01)
*G11B 5/73* (2006.01)

(52) U.S. Cl.
CPC ............ *G11B 5/66* (2013.01); *G11B 5/7325* (2013.01)

(58) Field of Classification Search
None
See application file for complete search history.

(56) References Cited

U.S. PATENT DOCUMENTS

| | | |
|---|---|---|
| 5,603,766 A | 2/1997 | Visokay et al. |
| 5,824,409 A | 10/1998 | Sellmyer et al. |
| 6,007,623 A | 12/1999 | Thiele et al. |
| 6,086,974 A | 7/2000 | Thiele et al. |
| 6,139,907 A | 10/2000 | Sellmyer et al. |
| 6,183,606 B1 | 2/2001 | Kuo et al. |
| 6,468,670 B1 | 10/2002 | Ikeda et al. |
| 6,599,646 B2 | 7/2003 | Suzuki et al. |
| 6,716,516 B2 | 4/2004 | Futamoto et al. |
| 6,824,817 B2 | 11/2004 | Araki et al. |
| 6,830,824 B2 | 12/2004 | Kikitsu et al. |
| 6,834,026 B2 | 12/2004 | Fullerton et al. |
| 6,846,583 B2 | 1/2005 | Inaba et al. |
| 6,881,495 B2 | 4/2005 | Kikitsu et al. |
| 6,881,496 B2 | 4/2005 | Okamoto |
| 6,881,497 B2 | 4/2005 | Coffey et al. |
| 7,081,309 B2 | 7/2006 | Do et al. |
| 7,195,827 B2 | 3/2007 | Maeda et al. |
| 7,241,520 B2 | 7/2007 | Shin et al. |
| 7,282,278 B1 | 10/2007 | Nolan |
| 7,286,324 B2 | 10/2007 | Yasui et al. |
| 7,384,699 B2 | 6/2008 | Nolan et al. |
| 7,425,377 B2 | 9/2008 | Fullerton et al. |
| 7,435,489 B2 | 10/2008 | Umeda et al. |
| 7,488,545 B2 | 2/2009 | Fullerton et al. |
| 7,550,210 B2 | 6/2009 | Berger et al. |
| 7,556,870 B2 | 7/2009 | Do et al. |
| 7,572,526 B2 | 8/2009 | Berger et al. |
| 7,582,368 B2 | 9/2009 | Berger et al. |

(Continued)

FOREIGN PATENT DOCUMENTS

| | | |
|---|---|---|
| WO | 2008/030199 | 3/2008 |
| WO | 2008030199 A1 | 3/2008 |
| WO | 2010038448 | 4/2010 |

OTHER PUBLICATIONS

Lim et al. (Improvement of chemical ordering of FePt (001) oriented films by MgO buffer layer, Mar. 2008, Journal of Applied Physics 103, 07E143).*

(Continued)

*Primary Examiner* — Kevin M. Bernatz
*Assistant Examiner* — Linda Chau (57) ABSTRACT

FePt-based perpendicular magnetic recording (PMR) media including an epitaxial exchanged coupling layer (EECL) between FePtX magnetic recording layers. The degree of exchange coupling may be modulated by the EECL while the texture is transferred between the magnetic recording layers. With an EECL of proper composition and thickness, the FePt-based composite media has high anisotropy field and low saturation magnetic field.

22 Claims, 8 Drawing Sheets

(56) References Cited

U.S. PATENT DOCUMENTS

| | | |
|---|---|---|
| 7,625,643 B2 | 12/2009 | Umeda et al. |
| 7,638,210 B2 | 12/2009 | Berger et al. |
| 7,736,769 B2 | 6/2010 | Ajan |
| 8,173,282 B1 | 5/2012 | Sun et al. |
| 2002/0041980 A1 | 4/2002 | Suzuki et al. |
| 2003/0108721 A1 | 6/2003 | Fullerton et al. |
| 2003/0162041 A1 | 8/2003 | Nemoto et al. |
| 2003/0215675 A1* | 11/2003 | Inaba et al. ............ 428/694 TP |
| 2004/0110035 A1 | 6/2004 | Shin et al. |
| 2004/0185307 A1 | 9/2004 | Oikawa et al. |
| 2004/0191578 A1* | 9/2004 | Chen ............... G11B 5/653 428/831.2 |
| 2005/0106422 A1* | 5/2005 | Lu et al. ............. 428/694 TS |
| 2005/0227120 A1* | 10/2005 | Ichihara et al. ............. 428/830 |
| 2006/0166039 A1 | 7/2006 | Berger et al. |
| 2006/0177704 A1 | 8/2006 | Berger et al. |
| 2006/0188743 A1 | 8/2006 | Seki et al. |
| 2007/0009654 A1 | 1/2007 | Watanabe et al. |
| 2007/0026262 A1 | 2/2007 | Maeda |
| 2007/0231609 A1 | 10/2007 | Ajan et al. |
| 2007/0243418 A1 | 10/2007 | Fullerton et al. |
| 2007/0292720 A1 | 12/2007 | Suess |
| 2008/0180843 A1 | 7/2008 | Zhang et al. |
| 2008/0198512 A1* | 8/2008 | Mukai ..................... 360/313 |
| 2008/0292907 A1 | 11/2008 | Berger et al. |
| 2008/0299416 A1* | 12/2008 | Yoon et al. ................. 428/827 |
| 2008/0311430 A1 | 12/2008 | Chen et al. |
| 2009/0135527 A1* | 5/2009 | Lee et al. ..................... 360/314 |
| 2009/0257147 A1 | 10/2009 | Ajan |
| 2009/0290256 A1 | 11/2009 | Berger et al. |
| 2010/0062286 A1 | 3/2010 | Suess |
| 2010/0128391 A1 | 5/2010 | Berger et al. |
| 2010/0209737 A1* | 8/2010 | Bian et al. ..................... 428/827 |
| 2010/0247960 A1 | 9/2010 | Qiu et al. |
| 2011/0003175 A1 | 1/2011 | Valcu et al. |
| 2011/0122525 A1 | 5/2011 | Nemoto et al. |
| 2012/0026626 A1 | 2/2012 | Nolan et al. |

OTHER PUBLICATIONS

UCDAVIS, 7.6: Introduction to Crystals.*
English machine translation of JP08-30951, Japan, Feb. 1996. (8 pages).
Zhu, Jimmy, "Understand PMR Media," Data Storage Systems Center, Carnegie Mellon University, 2009, 16 pages.
Wang, Jian-Ping et al., "Exchange Coupled Composite Media for Perpendicular Magnetic Recording", IEEE Transactions on Magnetics, vol. 41, No. 10, pp. 3181-3186, Oct. 2005.
Hu, Jiang Feng et al., "Exchange Coupling Assisted FePtC Perpendicular Recording Media", Applied Physics Letters 93, 072504 pp. 1-3, Aug. 2008.
Chen, Jing Sheng et al., "High Coercivity L10 FePt Films with Perpendicular Anisotropy Deposited on Glass Substrate at Reduced Temperature", Applied Physics Letters 90, 042508 pp. 1-3, Jan. 2007.
H. Nakagawa, et al., "Effects of Thin Carbon Intermediate Layer on Magnetic and Structural Properties of Perpendicular Recording Media", Journal of Magnetism and Magnetic Materials, 235, pp. 73-77, 2001.

* cited by examiner

PERPENDICULAR MAGNETIC RECORDING MEDIUM WITH EPITAXIAL EXCHANGE COUPLING LAYER

TECHNICAL FIELD

This invention relates to the field of disk drives and more specifically, to FePt-based perpendicular magnetic recording media for disk drives.

BACKGROUND

Figure 1:
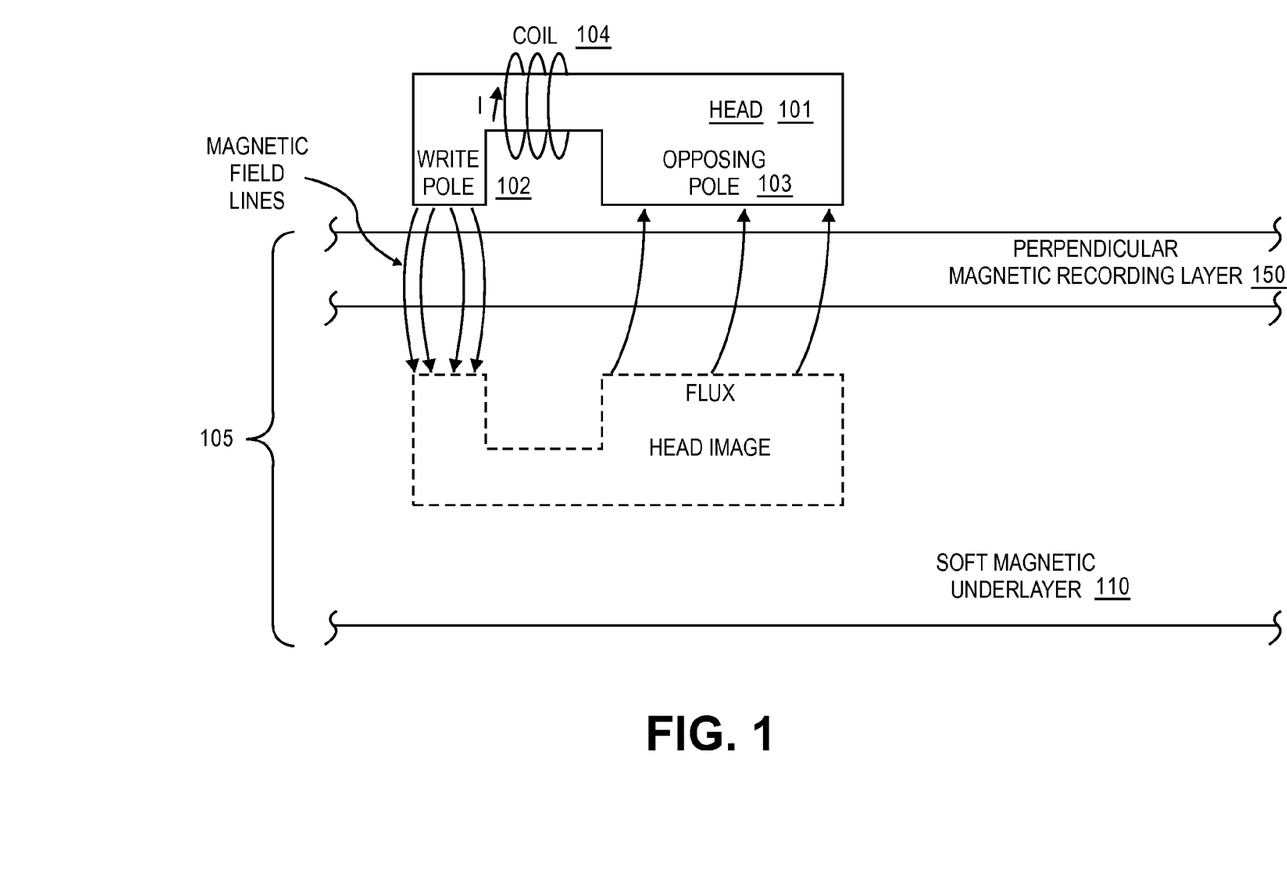
FIG. 1 illustrates a conventional perpendicular recording disk drive system.

Magnetic recording media has begun to incorporate perpendicular magnetic recording (PMR) technology in an effort to increase areal density and is now working toward densities of 800 Gbits/in$^2$. Generally, PMR media may be partitioned into two primary functional regions: a soft magnetic underlayer (SUL) and a magnetic recording layer(s) (RL). FIG. 1 illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

Higher areal densities are typically achieved with well-isolated smaller grains in the PMR layer 150. A higher magnetic anisotropy constant ($K_u$) is typically required to resist the demagnetization effects of the perpendicular geometry and to keep the smaller grains thermally stable to reduce media noise. US patent publication 2004/0185307 describes magnetic recording layers employing an ordered alloy such as CoPt and FePt having an L10 structure. While such an L10 ordered alloy can exhibit a high $K_u$ that is beneficial for thermal stability and reduction of noise, due to the limit of a head writing field, media with such high magnetic anisotropy may exceed a coercivity threshold and may not be recordable by the recording head 101.

The writing field of high anisotropy media can be decreased using an exchange coupled composite (ECC) media in which a composite recording layer employs a magnetic soft layer to exchange couple a magnetic hard layer. For such ECC media, the magnetically soft region will switch in presence of an external field (e.g., applied by recording head 101) and apply a magnetic torque assisting a switching of the magnetically hard region and thereby decreasing the media writing field required for highly anisotropic media. A non-FePt ECC media with hard and soft magnetic layers separated by a nonmagnetic exchange coupling layer has been demonstrated by J. P. Wang et al., *Exchange Coupled Composite Media for Perpendicular Magnetic Recording*, IEEE Trans. on Magnetics, Vol. 41, No. 10, 3181 (October 2005). However, for L10 FePt high anisotropy media, the concept of exchange coupling assisted composite media has only been demonstrated without an exchange coupling interlayer. For example, formation of a soft magnetic FePtC layer on a hard magnetic FePtC layer is described in J. S. Chen, et al., *High Coercivity L1$_0$ FePt Films with Perpendicular Anisotropy Deposited on Glass Substrate at Reduced Temperature*, Appl. Phys. Lett., Volume 90, Issue 4 (2007). In Chen, et al., reliance on carbon segregation between the hard and soft magnetic layers results in exchange coupling that is uncontrolled. As such, an EEC construction in L10 FePt-based media is heretofore unknown.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention include an epitaxial exchange coupling layer (EECL) between a first and second magnetic recording layer to provide a controllable and tunable exchange coupling between the first and second magnetic recording layers while also enabling epitaxial transfer of texture from the first magnetic recording layer to the second magnetic recording layer. Between the first and second magnetic recording layers, the degree of exchange coupling may be adjusted by modulating the thickness of the EECL while still maintaining a desired texture in the top magnetic layer. In the exemplary embodiment, with proper selection of EECL composition and thickness, L10 ordering achieved in the first recording layer with first film formation conditions and is transferred to the second recording layer with second film formation conditions.

Figure 2:
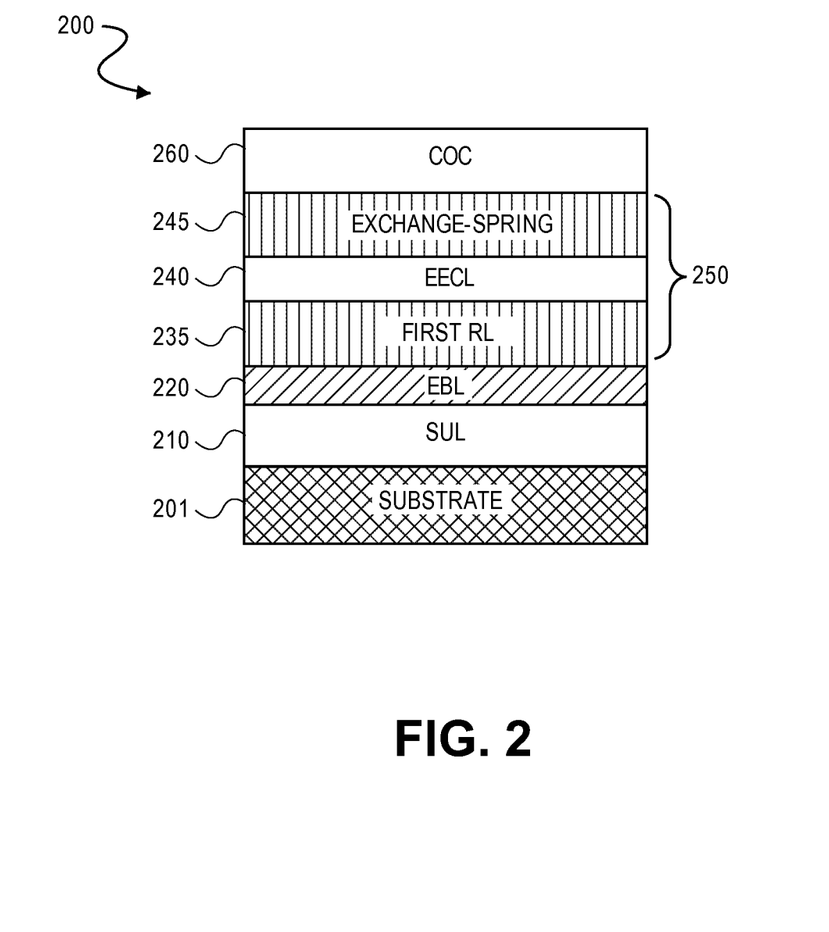
FIG. 2 illustrates a cross-sectional view of a composite FePtX media structure including an epitaxial exchange coupling layer (EECL), in accordance with an embodiment.

FIG. 2 illustrates a cross-sectional depiction of an exemplary embodiment of a PMR media structure 200 including an EECL 240 disposed between portions of a composite magnetic recording layer (RL) 250. It should be appreciated that the layers discussed herein may be formed on both sides of substrate to form a double-sided magnetic recording disk. However, only the layers on a single side of substrate are shown for ease of illustration. Alternatively, a single sided perpendicular magnetic recording disk may also be formed.

As depicted in FIG. 2, the PMR media structure 200 includes a substrate 201. Substrate 201 may be, for example, a glass, a metal, and/or a metal alloy material. In a particular embodiment, the substrate 201 is disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used. Substrate 201 may also be plated with a nickel phosphorous (NiP) layer (not shown). The substrate surface (or the plated NiP surface) may be polished and/or textured.

Disposed over the substrate 201 is a SUL 210. A seed layer or adhesion layer (not shown) may also be disposed between the substrate and the SUL 210, as known in the art. Generally, the SUL 210 may include any materials known in the art. The SUL 210 itself may be laminated or multilayered of a plurality of soft magnetic layers separated by nonmagnetic or antiferromagnetic films. In one exemplary embodiment, the SUL 210 includes a synthetic antiferromagnet (SAF) structure comprising two amorphous soft ferromagnetic layers (e.g., CoTaZr or CoFeTaZr, etc.) antiferromagnetically coupled with one another across a spacer layer (e.g. ruthenium (Ru)) there-between. The thickness of the SUL 210 will generally be in the range of 5 nm to 50 nm.

One or more intermediate layers or "exchange break" layers (EBL) 220 may be disposed between the SUL 210 and the composite RL 250. The EBL 220 regulates the magnetic exchange coupling between the SUL 210 and composite RL 250 and further serves to transfer texture to the composite RL 250. The EBL 220 may include multiple non-magnetic intermediate layers, one of which may be a structured nucleation layer for a finer crystalline structure and a c-axis preferred orientation of the composite RL 250. In the exemplary embodiment, the EBL 220 includes a structured nucleation layer of CrX with an as-deposited surface (200) plane which evolves (002) texture from which a dominant crystal alignment plane (001) can be developed in the L10-type ordered alloy of the composite magnetic RL 250. For the CrX alloy nucleation layer, X may be any of: B, Mo, Ta, W, CrRuB alloys with the exemplary embodiment being CrRu. The EBL 220 may also include an intermediate layer between the nucleation layer and the composite RL 250, for example to buffer lattice mismatch between the CrRu nucleation layer and composite RL 250. In embodiments, a second layer of the EBL 220 comprises one or more of Pt, Pd, C, Ag, RuAl, NiAl, Ru, Cu, and MgO. For the exemplary embodiment employing a CrRu nucleation layer, the EBL 220 further includes a layer of MgO with (001) texture which epitaxially transfers texture from the developed CrRu (002) layer to the composite RL 250. Depending on the choice of EBL 220 composition, as well as the thickness of the composite RL 250, the thickness of the EBL 220 should be between about 5 nm and 30 nm.

Disposed over the EBL 220 is the composite magnetic RL 250 having a relatively higher coercivity than that of the SUL 210. The composite RL 250 includes at least a first magnetic recording layer 235 and an exchange-spring layer 245, both of which possess a substantially perpendicular (out-of-plane) anisotropy field $H_k$. While there may be any number of magnetic recording layers in the composite RL 250, the magnetic recording layer in which the magnetic orientation is changed in direct response to a write field, as opposed to a magnetic torque-assisted write field, is referred to herein as the "exchange-spring layer."

In the exemplary embodiment, the exchange-spring layer 245 has an out-of-plane coercivity ($H_{C^\perp}$) less than that of the first magnetic recording layer 235 (i.e., the exchange-spring layer 245 is the magnetically softest recording layer) and is ferromagnetically exchange coupled to the first magnetic recording layer 235. The lower $H_{C^\perp}$ of the exchange-spring layer 245 enables the magnetic orientation of the exchange-spring layer 245 to be changed in response to a write field. The change in orientation of the exchange-spring layer 245 then applies a magnetic torque on the exchange coupled first magnetic recording layer 235 which amplifies the write field and overcomes the higher $H_{C^\perp}$ of the magnetically harder first magnetic recording layer 235. In alternative embodiments where the $H_{C^\perp}$ of the first magnetic recording layer 235 and exchange-spring layer 245 are substantially the same, ferromagnetic exchange coupling in the composite RL 250 allows the relatively stronger field proximate to the write head to rotate the magnetization of the exchange-spring layer 245 so that the exchange-spring layer 245 similarly amplifies the write head field distal from the write head to reorient the field of first magnetic recording layer 235. Although in the exemplary embodiment, the exchange-spring layer 245 is disposed over the first magnetic recording layer 235, for embodiments where the exchange-spring layer 245 is sufficiently softer than first magnetic recording layer 235, the exchange-spring layer 245 may be disposed below the first magnetic recording layer 235.

In the PMR media structure 200, at least the first magnetic recording layer 235 is an L10 ordered alloy. In the exemplary embodiment, the first magnetic recording layer 235 comprises a FePtX alloy, with a concentration of iron (Fe), platinum (Pt), and X to form a ($Fe_xPt_yX_{1-(x+y)}$) metal alloy, such as FePtC. Constituents other than carbon may also be utilized in the FePtX alloy, such as, Cr, Zr, Cu, Ta, Co, and B, for example to stabilize the phase or tune the magnetic properties of the recording layer. In a further embodiment, the exchange-spring layer 245 also comprises a FePtX alloy and in the exemplary embodiment, the first magnetic recording layer 235 comprises a FePtX alloy with a higher concentration of platinum than the FePtX alloy of the exchange-spring layer 245 such that the coercivity of the first magnetic recording layer 235 is between approximately 5000 Oe and 30,000 Oe and the coercivity of the exchange-spring layer 235 is between approximately 10 Oe and 10,000 Oe. In alternative embodiments, the first magnetic and exchange-spring recording layers 235, 245 comprise a CoPtX alloy with L10 ordering.

In certain embodiments, at least one layer of the composite RL 250 includes inter-granular exchange coupling. In the exemplary FePtX embodiment having a higher Pt concentration in the first magnetic recording layer 235, both the first magnetic recording layer 235 and exchange-spring layer 245 are granular alloys with the inter-granular exchange coupling of the exchange-spring layer 245 being greater than that of the first magnetic recording layer 235. To provide grain isolation at least one layer of the composite magnetic RL 250 includes one or more oxide materials to form a FePtX-oxide system. In the exemplary embodiment, the FePtX alloys of both the exchange-spring layer 245 and the first magnetic recording layer 235 are combined with an oxide material. Such an oxide material includes at least one of magnesium oxide (MgO), boron(III) oxide ($B_2O_3$), silicon dioxide ($SiO_2$), chromium oxides (e.g., chromium(IV) oxide ($CrO_2$) or chromium(III) oxide ($Cr_2O_3$)), titanium oxides (e.g., titanium(IV) oxide ($TiO_2$) or titanium(III) oxide ($Ti_2O_3$)), tantalum oxides (e.g., tantalum(V) oxide ($Ta_2O_5$)), niobium oxides (e.g., niobium (V) oxide ($Nb_2O_5$)), nickel oxides (e.g., nickel (II) oxide (NiO)), zirconium dioxide ($ZrO_2$), hafnium dioxide ($HfO_2$), vanadium oxides (e.g., vanadium(V) oxide ($V_2O_5$)), aluminum oxide ($Al_2O_3$) and tungsten oxides (e.g., tungsten(VI) oxide ($WO_3$) or tungsten(IV) oxide ($WO_2$)).

Disposed between the first magnetic recording layer 235 and exchange-spring layers 245 is the EECL 240. As previously noted, the EECL 240 is to transfer the epitaxial growth from the first magnetic recording layer 235 to the top magnetic recording layer 245 and to set the degree of exchange coupling between the first magnetic and exchange-spring recording layers 235, 245. The ability to transfer the epitaxial growth across the EECL 240 enables the composite RL 250 to retain the high anisotropy available in an L10 ordered media throughout the thickness of the composite RL 250 while the ability to set the degree of exchange coupling between layers of the composite RL 250 provides an additional degree of freedom for achieving both a high coercivity ($H_C$) and a low saturation magnetic field ($H_S$) in the composite RL 250. The dual functionality of coupling regulation and texture transfer constrains the EECL 240 both in terms of composition and layer thickness. The EECL 240 may include one or more of Pt, Pd, Ag, X, or MgO with the layer thickness being less than approximately 2 nm. In the exemplary embodiment, the EECL 240 is Pt and has a layer thickness of between approximately 0.2 nm and approximately 1.0 nm. In other embodiments, the EECL 240 includes both Pt and an oxide material such as one of more of $SiO_2$, $TiO_2$, $Cr_2O_3$, $WO_3$, and Ta oxide.

In one embodiment, having less than a 3% change in c-axis lattice constant between the first magnetic recording layer 235 and the exchange-spring layer 245, a Pt (001) EECL 240 having a thickness between about 0.2 nm and 1.0 nm transfers the FePt(001) texture below the EECL 240 to the FePt(001) disposed above the EECL 240. In the exemplary embodiment having a first magnetic recording layer 235 comprising a first FePtC alloy with a c-axis lattice constant of approximately 3.7 Å, a Pt EECL 240 with a thickness between about 0.2 nm and about 1.0 nm transfers (001) texture to the exchange-spring layer 245 comprising a second FePtC alloy having a c-axis lattice constant of (3.7+/−0.1)Å.

With the thickness of the EECL 240 less than about 2 nm, the composite magnetic recording layer 250 may range from between 5 nm and 20 nm with the exchange-spring layer having a thickness of less than about 10 nm to maintain high anisotropy and low saturation magnetic field. In the exemplary embodiment, a FePtC exchange-spring layer 245 has a thickness of between about 2 nm and 6 nm.

Completing the PMR media structure 200, one or more layers may be formed on over the composite magnetic recording layer 250. For example, an overcoat (OC) may be used on top of the top magnetic recording layer to meet tribological requirements such as contact-start-stop (CSS) performance and corrosion protection. Predominant materials for the overcoat layer are carbon-based materials, such as hydrogenated or nitrogenated carbon to form a carbon over coat (COC) 260. A lubricant may be placed (e.g., by dip coating, spin coating, etc.) on top of the overcoat layer to further improve tribological performance. Exemplary lubricants include a perfluoropolyether or phosphazene lubricant or a composite thereof.

Figure 3:
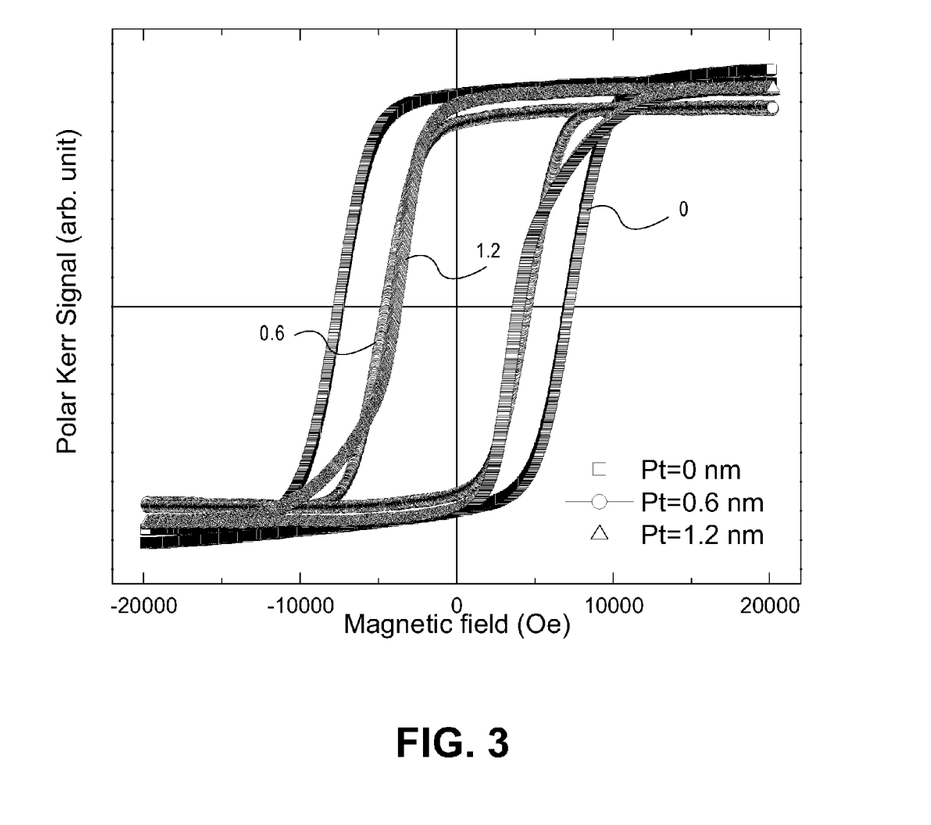
FIG. 3 illustrates a polar Kerr loop of a composite FePtX media structure including an epitaxial exchange coupling layer (EECL), in accordance with an embodiment.

FIGS. 3 through 6 illustrate characteristics of the EECL 240 and of a full stack FePt-based composite PMR media structure 200. FIG. 3 depicts a polar Kerr loop of one exemplary composite RL 250 having first magnetic recording layer 235 and an exchange-spring layer 245 including FePtC at fixed thicknesses and separated by a Pt EECL 240 having a layer thickness varying between 0 nm, (no EECL 240), 0.6 nm, and 1.2 nm. As depicted in FIG. 3, the composite RL 250 is fully exchange coupling when the EECL 240 is absent while the loop corresponding to a Pt thickness of 1.2 nm indicate the recording layers are fully exchange decoupled.

Figure 4:
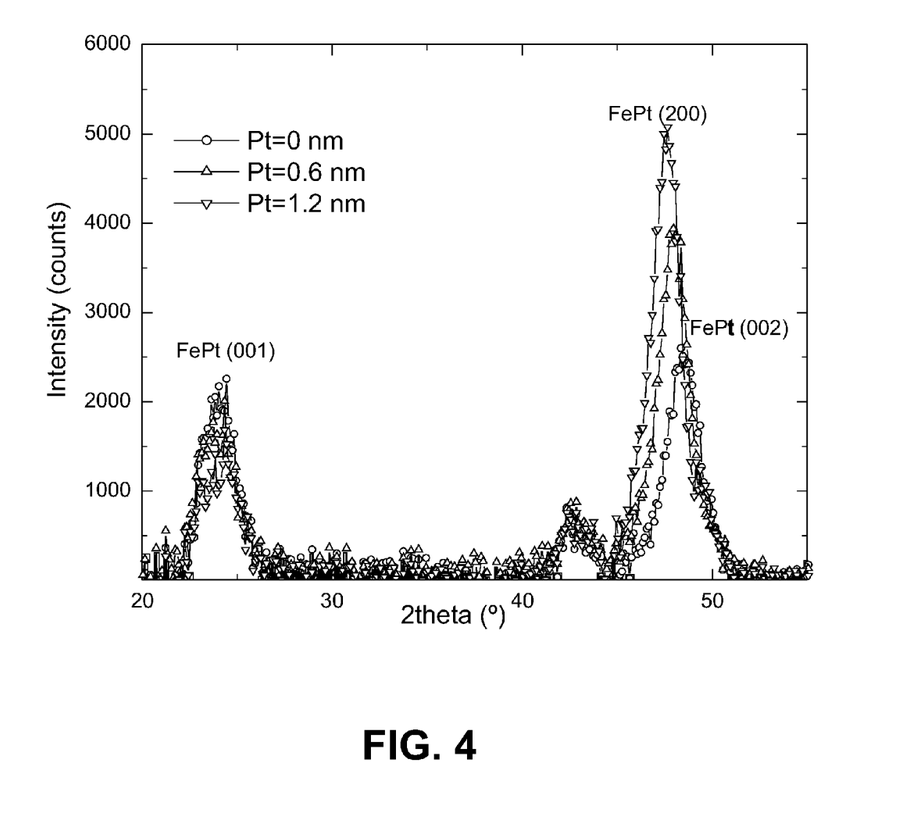
FIG. 4 illustrates XRD data of a composite FePtX media structure including an epitaxial exchange coupling layer (EECL), in accordance with an embodiment.
Figure 5:
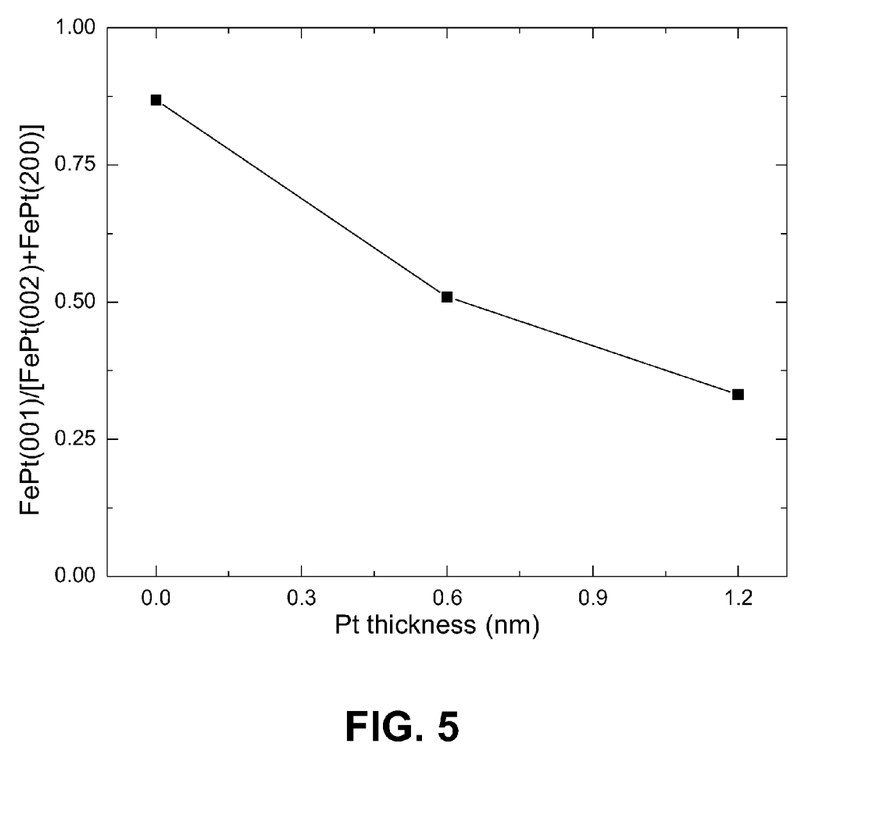
FIG. 5 illustrates a diffraction peak intensity ratio of FePt (001)/[FePt(002)+FePt(200)] of a composite FePtX media structure including an epitaxial exchange coupling layer (EECL), in accordance with an embodiment.

FIG. 4 depicts an XRD 2θ patterns of the composite RL 250 provided for the polar Kerr measurement depicted in FIG. 3 as a function of the Pt EECL 240 thickness. As shown the x-ray power diffraction intensity of FePt(001) decreases for a first level (which is dependent on the thickness of the composite RL 250) while the diffraction intensity of FePt(200) and (002) increases with increasing thickness of the EECL Pt thickness. FIG. 5 further depicts a diffraction peak intensity ratio of FePt(001)/[FePt(002)+FePt(200)] for the composite RL 250 as the EECL 240 is inserted between recording layers having a fixed thickness. This intensity ratio decreases with the increasing thickness of the EECL Pt layer thickness indicating the ability of the EECL layer 240 to epitaxially transfer texture is limited to below about 1.2 nm. Since a Pt thickness of 1.2 nm corresponds to a fully exchange decoupled system, the exchange coupled embodiments are expected to have a FePt(001)/[FePt(002)+FePt(200)] intensity ratio somewhat greater than 0.3.

Figure 6:
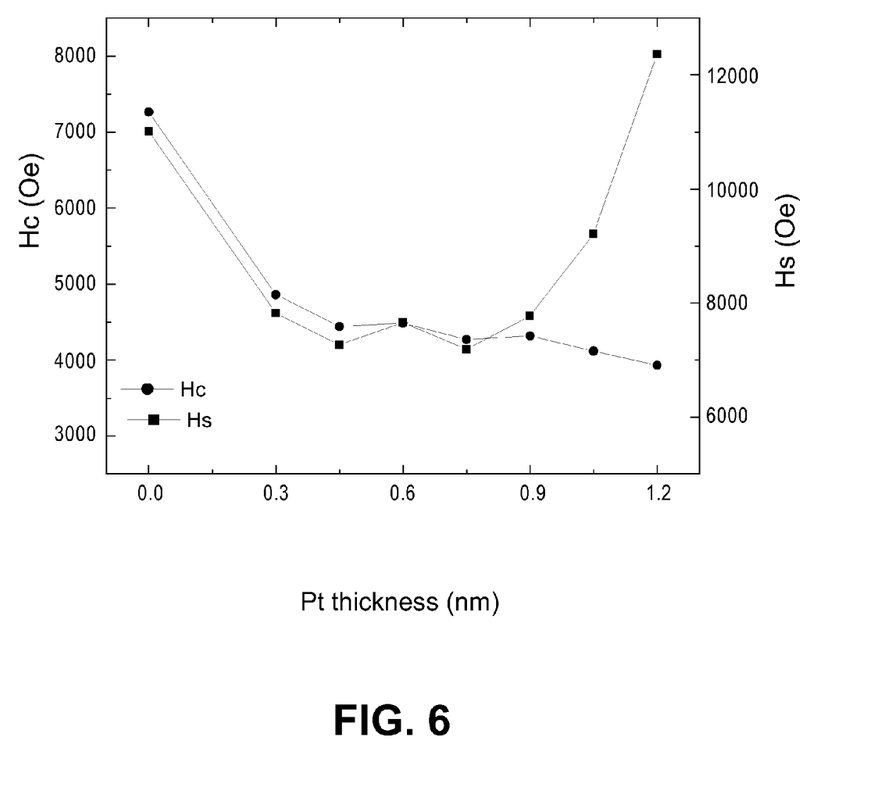
FIG. 6 illustrates out-of-plane coercivity and saturation field for a composite FePtX media structure including an epitaxial exchange coupling layer (EECL), in accordance with an embodiment.

FIG. 6 shows the $H_{C^\perp}$ and saturation field ($H_S$) of the composite RL 250 provided for the polar Kerr measurement depicted in FIG. 3 as a function of the Pt EECL 240 thickness. As depicted, insertion of the Pt EECL 240 decreases $H_C$ and saturation field ($H_S$) over the range of Pt thicknesses which provide exchange coupling (e.g., below 1.2 nm).

Figure 7:
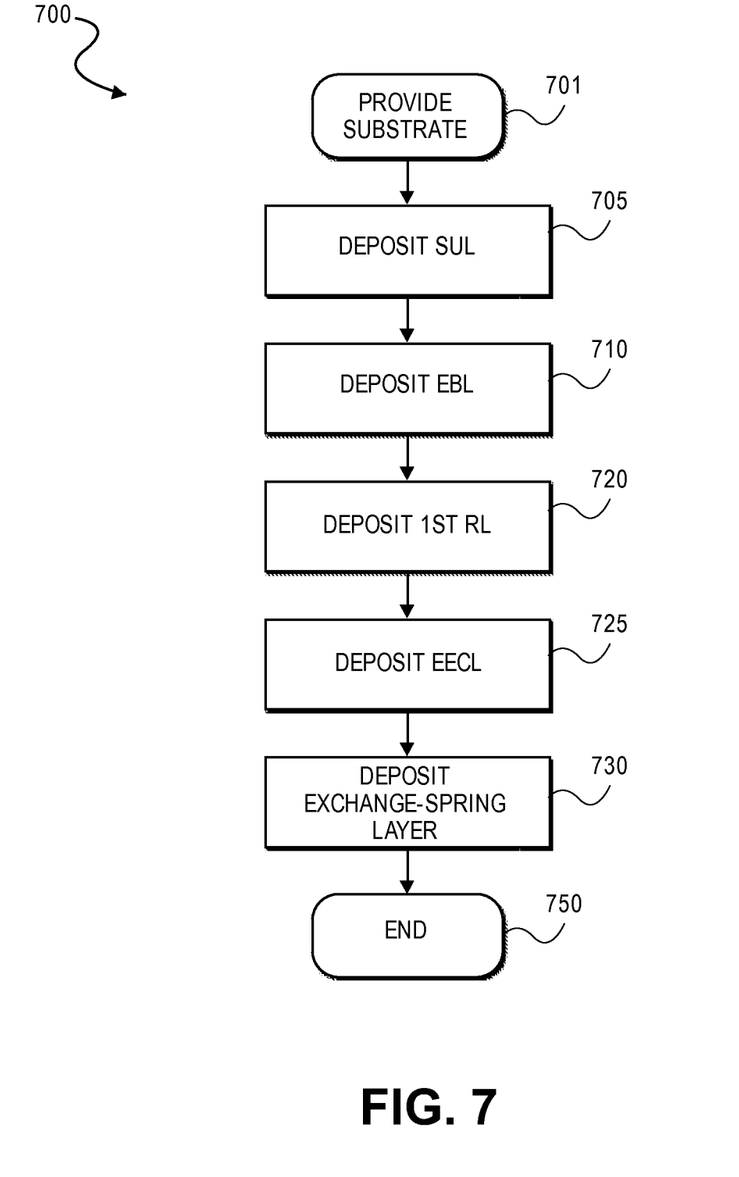
FIG. 7 illustrates one embodiment of a method of manufacturing a magnetic recording disk with a composite FePtX media structure including an epitaxial exchange coupling layer (EECL), in accordance with an embodiment of the present invention.

FIG. 7 illustrates one embodiment of a method of manufacturing perpendicular magnetic recording disk having a FePt-based composite PMR media structure such as that described elsewhere herein in reference to FIG. 2. A substrate 201 is generated, or otherwise provided, at operation 701. The generation of a substrate for a magnetic recording disk is known in the art; accordingly a detailed discussion is not provided. At operation 705, the SUL 210 including any of the materials described elsewhere herein, such as CoFeTaZr, is deposited over substrate 201.

At operation 710 the EBL 220 comprising any of the materials described elsewhere herein, such as an MgO layer on a CrRu layer, is deposited over the SUL 110. Although any deposition method may be employed at operations 705 and 710, in the exemplary embodiment the EBL 220 is sputter deposited with predominantly (200) and/or (002) texture. For one embodiment employing a CrRuHCP alloy deposited with a (200) texture, an MgO EBL 220 is deposited with a (100)

texture. For such an embodiment, the (100) texture of the MgO transfers texture from the CrRu (which develops (002) texture during subsequent thermal processing) and promotes the L10-ordering of the composite RL 250

At operation 720, the first magnetic recording layer 235 is deposited over the EBL 220. In a particular embodiment, the first magnetic recording layer is deposited at a pressure between approximately 10 mTorr and 80 mTorr and at a relatively high temperature of between approximately 300° C. and 460° C. to achieve a high coercivity and promote L10 ordering in the first magnetic recording layer 235. In an embodiment, the first magnetic recording layer 235 is deposited with a reactive sputtering process where oxygen ($O_2$) is introduced into the sputtering chamber during deposition of the first magnetic recording layer 235. The amount of $O_2$ provided during deposition may vary depending on the target alloy composition, deposition system configuration, etc. In particular embodiments, the target alloy oxide content is sufficiently high that no $O_2$, or only a small amount of $O_2$ is provided. For example, $O_2$ may be provided at a partial pressure range between approximately 0 mTorr (i.e. non-reactive sputtering) and 1.2 mTorr. In alternative reactive sputtering embodiments, $O_2$ is provided at a higher partial pressure, for example between approximately 0.2 mTorr and 3 mTorr.

For operation 720, the sputter target alloy composition may be any capable of achieving the compositions described elsewhere herein for the first magnetic recording layer 235. In one embodiment, the sputter target includes a matrix having FePtX and one or more oxide materials. In still other embodiments, at operation 720, the various constituents of the first magnetic recording layer 235 (e.g., metal matrix species, oxides) may be deposited on a substrate using a plurality of targets. Multi-target deposition methods are known in the art and generally consist of simultaneously sputtering separate targets or target portions, each of differing composition to form a mixture of the plurality of target compositions on a substrate. Each target of a multi-target system may be in a separate sputter station and each sputter station may include, for example, a DC magnetron source (for metal targets) and RF magnetron source (e.g. for oxide targets). Thus, while one exemplary embodiment includes a single sputter target of a FePtC-oxide alloy which is DC magnetron sputtered to form the first magnetic recording layer 235, one of ordinary skill in the art will appreciate a similar multi-target process may also be performed.

At operation 725, the EECL 240 is deposited over the first magnetic recording layer 235 such that the EECL 240 epitaxially grows with the (001) texture of the first magnetic recording layer 235. In the exemplary embodiment, the EECL 240 is sputter deposited on the first magnetic recording layer 235 at a pressure between approximately 10 mTorr to 80 mTorr and a temperature of between approximately 200° C. and 460° C. While the sputter target composition may vary, in exemplary embodiments include a substantially pure Pt target or a Pt-oxide target containing any of the oxide materials described for the EECL 240.

At operation 730, the exchange-spring layer 245 is deposited on the EECL 240 such that the exchange-spring layer 245 epitaxially grows from the (001) structure of the first magnetic recording layer 235, thereby maintaining L10 ordering. In a particular embodiment, the exchange-spring layer 245 is deposited at a pressure between approximately 10 mTorr and 80 mTorr and at a temperature relatively lower than that used for formation of the first magnetic recording layer 235. For example, deposition of the exchange-spring layer 245 is performed at a temperature between approximately 25° C. and 250° C. in particular embodiments. The lower deposition temperature may provide for a lower coercivity in the exchange-spring layer 245 yet because of the (001) texture in the EECL the first magnetic recording layer 235 is epitaxially grown with the proper texture.

In an embodiment, the exchange-spring layer 245 is deposited with a reactive sputtering process where oxygen ($O_2$) is introduced into the sputtering chamber as described for deposition of the first magnetic recording layer 235. For operation 730, the sputter target alloy composition may be any capable of achieving the compositions described elsewhere herein for the exchange-spring layer 245. In one embodiment, the sputter target includes a matrix having FePt with a lower Pt content than that utilized for the formation of the first magnetic recording layer 235 and one or more oxide materials.

The method 700 is then completed at operation 750 with an optional additional thermal treatment (e.g. anneal) and a deposition of a protection layer, such as the COC 260.

The deposition of each of the SUL 210, EBL 220, first magnetic recording layer 235, EECL 240, and exchange-spring layer 245 can be accomplished by a variety of methods well known in the art, for example, electroless plating, sputtering (e.g., static or in-line), chemical vapor deposition (CVD), ion-beam deposition (IBD), etc. Static sputter systems are available from manufacturers such as Intevac Inc. of Santa Clara, Calif. and Canon-Anelva Corp. of Japan. With in-line sputtering systems, disk substrates are loaded on a pallet that passes through a series of deposition chambers the deposit films successively on substrates. In-line sputtering systems are available from manufacturers such as Ulvac Corp. of Japan.

Figure 8:
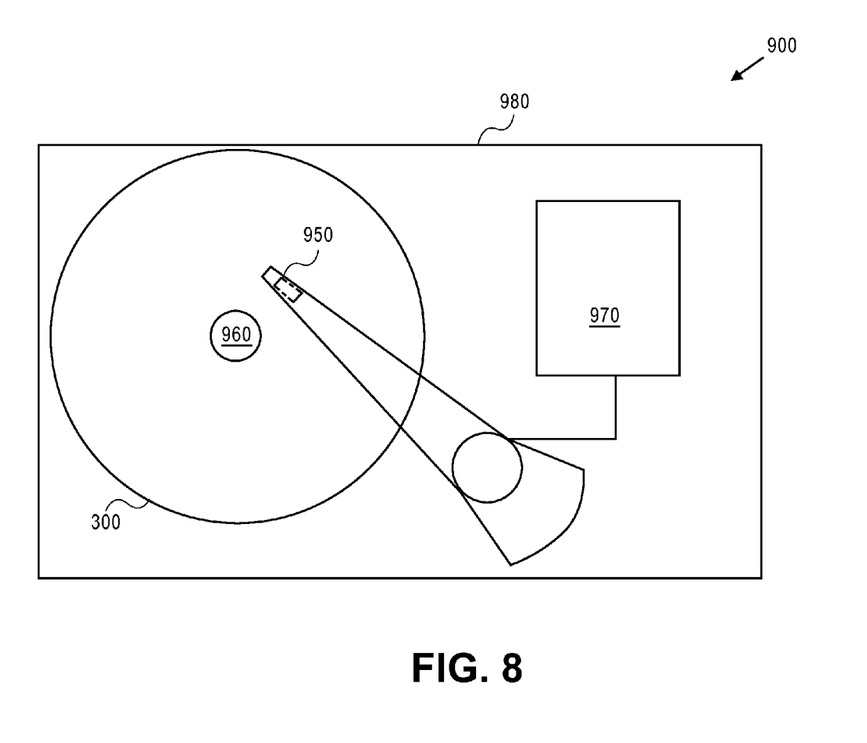
FIG. 8 illustrates a disk drive including a perpendicular magnetic recording disk with a composite FePtX media structure including an epitaxial exchange coupling layer (EECL) in accordance with an embodiment of the present invention.

FIG. 8 illustrates a disk drive having disk 300. Disk drive 900 may include one or more disks 300 to store data. Disk 300 resides on a spindle assembly 960 that is mounted to drive housing 980. Data may be stored along tracks in the magnetic recording layer of disk 300. The reading and writing of data is accomplished with head 950 that has both read and write elements. The write element is used to alter the properties of the perpendicular magnetic recording layer of disk 300. In one embodiment, head 950 may have magneto-resistive (MR), or giant magneto-resistive (GMR) elements. In an alternative embodiment, head 950 may be another type of head, for example, an inductive read/write head or a Hall effect head. A spindle motor (not shown) rotates spindle assembly 960 and, thereby, disk 300 to position head 950 at a particular location along a desired disk track. The position of head 950 relative to disk 300 may be controlled by position control circuitry 970. The use of disk 300 fabricated in the manners discussed above may improve the performance of the perpendicular magnetic recording layer of disk 300.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium for perpendicular recording applications, the recording medium comprising:
   a substrate;
   a soft underlayer on the substrate;
   an exchange break layer consisting of a nucleation layer directly on the soft underlayer and an intermediate layer, wherein the nucleation layer consists of CrRu with a (002) crystal structure and the intermediate layer consists of MgO with a (001) crystal structure; and a composite recording layer directly on the intermediate layer of the exchange break layer and comprising:
  a first magnetic recording layer comprising a first FePtX alloy and having an axis of magnetic anisotropy substantially perpendicular to a surface thereof;
  an exchange-spring layer comprising a second FePtX alloy and having a coercivity less than that of the first magnetic recording layer, the exchange-spring layer ferromagnetically exchange coupled to the first magnetic recording layer; and
  a coupling layer between the first magnetic recording layer and the exchange-spring layer, the coupling layer configured to regulate the ferromagnetic exchange coupling between the first magnetic recording layer and the exchange-spring layer and to transfer an epitaxial growth from the first magnetic recording layer to the exchange-spring layer,
wherein the exchange break layer is configured to magnetically decouple the soft underlayer from the composite recording layer,
wherein the coupling layer consists of Pt with a (001) crystal structure, and
wherein a change in a c-axis lattice constant between the first magnetic recording layer and the exchange-spring layer is less than 3%.

2. The recording medium of claim 1, wherein the first magnetic recording layer has a c-axis lattice constant of approximately 3.7 Å, and the exchange-spring layer has a c-axis lattice constant of approximately 3.7+/−0.1 Å.

3. The recording medium of claim 1, wherein the first and second FePtX alloys further comprise a concentration of iron (Fe), platinum (Pt), and X to form a $(Fe_xPt_yX_{1-(x+y)})$ metal alloy, wherein X is selected from the group consisting of C, Cr, Zr, Cu, Ta, Co, and B, and wherein the first magnetic recording layer and the exchange-spring layer include at least one oxide material selected from the group consisting of $SiO_2$, MgO, $Al_2O_3$, $TiO_2$, Ta oxide, $Cr_2O_3$, and $B_2O_3$.

4. The recording medium of claim 1, wherein the first and second FePtX alloys are L10 ordered and comprise an alloy of FePtC.

5. The recording medium of claim 4, wherein the first magnetic recording layer and the exchange-spring layer include at least one oxide material selected from the group consisting of $SiO_2$, $TiO_2$, Ta oxide, $Cr_2O_3$, and $WO_3$.

6. The recording medium of claim 1, wherein the first FePtX alloy has a higher concentration of platinum than the second FePtX alloy such that the coercivity of the first magnetic recording layer is between approximately 5,000 Oe and 30,000 Oe and the coercivity of the exchange-spring layer is between approximately 10 Oe and 10,000 Oe.

7. The recording medium of claim 1, wherein the coupling layer has a thickness of less than about two nanometers.

8. The recording medium of claim 7, wherein the coupling layer has a thickness between about 0.2 nanometers and about 1 nanometer.

9. The recording medium of claim 1, wherein the exchange-spring layer has a thickness of less than about ten nanometers.

10. The recording medium of claim 9, wherein the exchange-spring layer has a thickness of between about two nanometers and about six nanometers.

11. The recording medium of claim 1, wherein the first magnetic recording layer and the exchange-spring layer each include inter-granular exchange coupling, wherein the inter-granular exchange coupling of the exchange-spring layer is greater than the inter-granular exchange coupling of the first magnetic recording layer.

12. The recording medium of claim 1, wherein the soft underlayer is physically coupled to the first magnetic recording layer through the exchange break layer magnetically decoupling the soft underlayer from the first magnetic recording layer.

13. The recording medium of claim 1, wherein the exchange break layer is configured to regulate an exchange coupling between the soft underlayer and the composite recording layer.

14. The recording medium of claim 13:
  wherein the first and second FePtX alloys are L10 ordered and comprise an alloy of FePtC; and
  wherein the first magnetic recording layer and the exchange-spring layer include at least one oxide material selected from the group consisting of $SiO_2$, $TiO_2$, Ta oxide, $Cr_2O_3$, and $WO_3$.

15. The recording medium of claim 13, wherein the first and second FePtX alloys further comprise a concentration of iron (Fe), platinum (Pt), and X to form a $(Fe_xPt_yX_{1-(x+y)})$ metal alloy, wherein X is selected from the group consisting of Cr, Zr, Ta, and Co, and wherein the first magnetic recording layer and the exchange-spring layer include at least one oxide material selected from the group consisting of $SiO_2$, $Al_2O_3$, $TiO_2$, Ta oxide, and $Cr_2O_3$.

16. A recording device for perpendicular recording applications, the recording device comprising:
  a recording head; and
  a recording medium configured for perpendicular recording, wherein the recording head is configured to read magnetic signals from, and write magnetic signals to, the recording medium, wherein the recording medium comprises:
    a substrate;
    a soft underlayer on the substrate;
    an exchange break layer consisting of a nucleation layer directly on the soft underlayer and an intermediate layer, wherein the nucleation layer consists of CrRu with a (002) crystal structure and the intermediate layer consists of MgO with a (001) crystal structure; and
    a composite recording layer directly on the exchange break layer and comprising:
      a first magnetic recording layer having an axis of magnetic anisotropy substantially perpendicular to a surface thereof;
      an exchange-spring layer interposed between the first magnetic recording layer and the recording head, the exchange-spring layer having a coercivity less than that of the first magnetic recording layer, the exchange-spring layer ferromagnetically exchange coupled to the first magnetic recording layer; and
      a coupling layer between the first magnetic recording layer and the exchange-spring layer, the coupling layer configured to regulate the ferromagnetic exchange coupling between the first magnetic recording layer and the exchange-spring layer and configured to transfer an epitaxial growth from the first magnetic recording layer to the exchange-spring layer, wherein the first magnetic recording layer and the exchange-spring layer both comprise granular FePtX alloys,
    wherein the exchange break layer is configured to magnetically decouple the soft underlayer from the composite recording layer,
    wherein the coupling layer consists of Pt with a (001) crystal structure, and wherein a change in a c-axis lattice constant between the first magnetic recording layer and the exchange-spring layer is less than 3%.

17. The recording device of claim 16, wherein the granular FePtX alloys comprises FePtC.

18. The recording device of claim 17, wherein the first magnetic recording layer comprises a higher concentration of platinum than the exchange-spring layer such that the coercivity of the first magnetic recording layer is greater than that of the exchange-spring layer.

19. The recording device of claim 16, wherein the coupling layer has a thickness between about 0.2 nanometers and about 1 nanometer.

20. The recording device of claim 16, wherein the exchange break layer is configured to regulate an exchange coupling between the soft underlayer and a composite recording layer.

21. The recording device of claim 20:
wherein the granular FePtX alloys are L10 ordered and comprise an alloy of FePtC; and
wherein the first magnetic recording layer and the exchange-spring layer include at least one oxide material selected from the group consisting of $SiO_2$, $TiO_2$, Ta oxide, $Cr_2O_3$, and $WO_3$.

22. The recording device of claim 16, wherein the granular FePtX alloys further comprise a concentration of iron (Fe), platinum (Pt), and X to form a $(Fe_xPt_yX_{1-(x+y)})$ metal alloy, wherein X is selected from the group consisting of Cr, Zr, Ta, and Co, and wherein the first magnetic recording layer and the exchange-spring layer include at least one oxide material selected from the group consisting of $SiO_2$, $Al_2O_3$, $TiO_2$, Ta oxide, and $Cr_2O_3$.

* * * * *